United States Patent Office.

JOHN LEWIS SAMUELS, OF SAN FRANCISCO, CALIFORNIA.

Letters Patent No. 60,794, dated January 1, 1867.

---

IMPROVED COMPOSITION FOR PREPARING AND HARDENING WOOD AND PRESERVING THE SAME.

---

*The Schedule referred to in these Letters Patent and making part of the same.*

---

TO ALL WHOM IT MAY CONCERN:

Be it known that I, JOHN LEWIS SAMUELS, of the city and county of San Francisco, in the State of California, have invented a new and useful Combination of Matter for Preparing and Hardening Wood and Timber, so as to render them impervious to the influence of wet and dry rot and the attacks of worms and insects; and I do hereby declare that the following is a full and exact description thereof.

The nature of my invention consists in the use of a composition of matter, consisting of sulphate of iron, common lime, and water, mixed in solutions in the proportion of one pound of sulphate of iron and three quarters of a pound of lime to each and every gallon of water, the said composition to be injected into the wood and timber in the common and known methods in use, by exhaustion and pressure or suction. The wood and timber, so prepared, are to be used in the construction of wharves, buildings, railways, furniture, streets, dry and wet docks, and all other purposes where wood and timber are used and are liable to rot and decay.

To enable others skilled in the art to make and use my invention, I will proceed to describe its composition and use: I make a solution of sulphate of iron and water, and another of common lime and water, in about the proportion above set forth, and in sufficient quantity to fully saturate the wood or timber to be injected, and then inject the solution into the pores of the wood or timber in any of the common and known methods of injection.

What I claim as my invention, and desire to secure by Letters Patent, is—

The use of the above-mentioned composition of sulphate of iron, common lime, and water, in about the above-mentioned proportions, for the purpose of injecting wood and timber, to render them impervious to the influence of wet and dry rot and the attacks of worms and insects.

JOHN LEWIS SAMUELS.

Witnesses:
  CHARLES T. HEALY,
  F. J. THIBAULT.